Oct. 22, 1963  F. C. POWERS  3,108,003
FLAVOR POCKET CAKE
Filed Nov. 13, 1961

INVENTOR.
FRANK C. POWERS
BY
ATTORNEYS

United States Patent Office 3,108,003
Patented Oct. 22, 1963

3,108,003
FLAVOR POCKET CAKE
Frank C. Powers, 24 Peterson Drive, Storm Lake, Iowa
Filed Nov. 13, 1961, Ser. No. 151,906
2 Claims. (Cl. 99—92)

This invention relates to bake goods, and more particularly to a decorative cake and cake batter.

Highly decorative party cakes often leave much to be desired in taste appeal. Further, they usually contain an over-abundance of calories due to thick decorative topping. Cakes baked for optimum taste appeal, or which have low calorie content, on the other hand, are not ordinarily sufficiently fanciful to blend with the debonair spirit of parties and other social gatherings. Further, to impart highly decorative and colorful characteristics to a cake is normally time-consuming and tedious, thereby increasing the cost of the item sufficiently to discourage its adoption for mere "get-togethers" and small parties.

It is an object of this invention to provide a novel cake which actually has as few calories as a conventional angel food cake, but which is also highly decorative, colorful, and attractive as a party cake, which is moreover highly appealing to the taste, and which requires practically no more time, effort and expense to make than a conventional angel food cake. The invention thus enables the combination of these normally rather inconsistent attributes.

It is another object of this invention to provide a cake batter and a method of making a cake having a variety of color and taste effects throughout the entire body of the cake in such a manner as to provide an airy, decorative effect. The cake is equally suitable for parties or private consumption. The variety of flavor and color effects is moreover displayed in each slice of cake.

Figure 1:
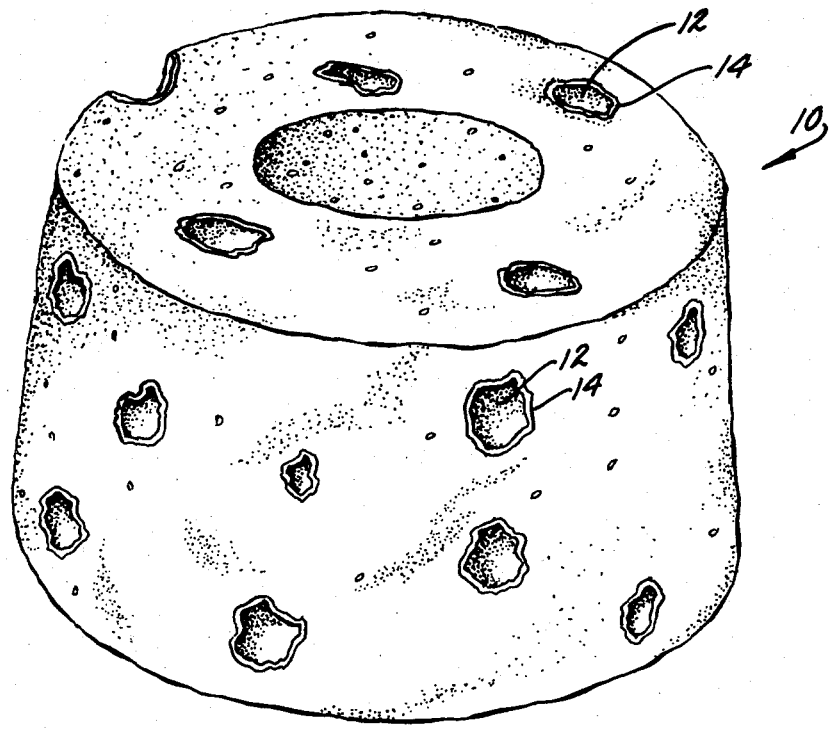
Figure 2:
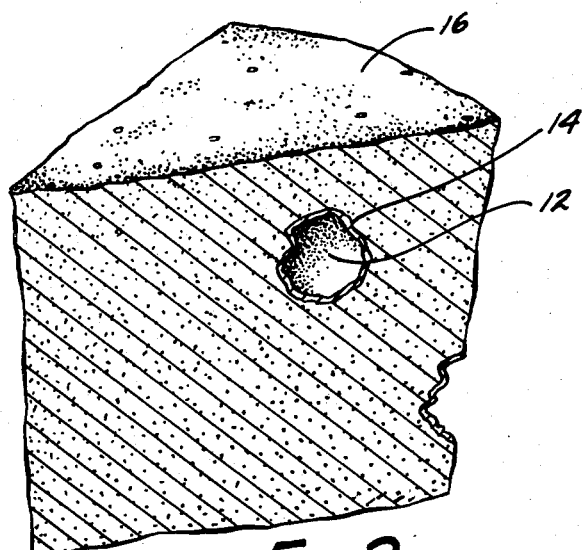

These and other objects will be apparent from a study of the following specification in conjunction with the drawings in which:

FIG. 1 is a perspective view of the novel cake formed according to the inventive method and with the novel batter; and FIG. 2 is a perspective view of a slice of the cake illustrated in FIG. 1.

Basically, the invention comprises a cake batter, preferably an angel food cake batter the bulk of which constitutes aerated egg whites having thousands upon thousands of minute air cells therein, and in which a plurality of colored marshmallows are dispersed, preferably of varied colors. The inventive method comprises the steps of preparing a cake batter, including a substantial amount of aerated egg whites to possess thousands of tiny air cells therein, distributing throughout the batter a plurality of colored marshmallows, and baking the batter to thereby produce a light, fluffy cake having highly colorful, marshmallow-lined air pockets therein. Each individual marshmallow causes the formation of an enlarged air pocket with a colored marshmallow lining.

The cake 10 is preferably formed using a conventional batter containing aerated egg whites, to which is added a large number of disbursed colored marshmallows approximately one-half inch or so in diameter. The size of each marshmallow may be varied to obtain different sized air pockets. The marshmallows used may be conventional ones including the usual ingredients of sugar, corn syrup, gelatin, corn starch, flavoring and coloring. The batter necessarily includes aerated egg whites, or the equivalent thereof, to obtain a closed air cell structure preventing escape of the air bubble which forms adjacent each marshmallow during baking. This closed air cell structure is very important. The basic batter preferably used is that of a conventional angel food cake, but other similar batters may conceivably be used. A typical batter for an angel food cake includes the principal ingredients of one cup of flour, 1⅝ cups of sugar, 1½ cups of egg whites, 1½ teaspoons of cream of tartar, ¼ teaspoon of salt, 1½ teasponns of vanilla, and ½ teaspoon of almond extract. These ingredients may be varied somewhat as is well-known. Instead of the preferred basic angel food batter, a chiffon cake batter my be utilized. This may include the principal ingredients of two cups of flour, 1½ cups of sugar, 3 teaspoons of baking powder, 1 teaspoon of salt, ½ cup of cooking (salad) oil, 12 egg yolks, ¾ cup of cold water, 2 teaspoons of vanilla, 2 teaspoons of grated lemon rind, ½ teaspoon of cream of tartar, and 1 cup of egg whites.

When the batter containing the marshmallows described heretofore is baked to form cake 10, the marshmallow appears as a thin colored lining 14 on air pockets 12 which are optionally about ½ inch or so in diameter. These pockets are scattered throughout the baked cake such that each slice 16 thereof displays great color, as well as the cake exterior.

The inventor herein does not pretend to fully understand the exact process which occurs when the distributed marshmallows eventually emerge as colored linings on enlarged air pockets. Thus, no scientific explanation is attempted. Indeed, the batter and cake was discovered almost by accident by the inventor who has dealt with baked products for many years. The resulting cake has been found to possess tremendous customer appeal due to its highly decorative and colorful nature, due to its low calorie content, due to its relative inexpensiveness, due to the appealing flavors thereof. It requires no thick frosting or topping to obtain decorative colorful effects since it already possesses such.

Certain obvious modifications of the batter, method and cake described may be apparent to those in the art by studying this specification. The invention is not to be limited to the form disclosed but only by the scope of the appended claims and the reasonable equivalents thereof.

I claim:

1. An angel food cake batter capable of forming a highly decorative and colorful cake having varied-color, lined flavor pockets scattered throughout; the bulk of said batter comprising whipped egg whites having thousands upon thousands of closed tiny air cells therein; and a plurality of colored marshmallows distributed throughout said batter, whereby upon baking of said batter said air cells will expand to form a lofty angel food cake and said marshmallows will form marshmallow-lined enlarged air pockets throughout said cake.

2. A colorful and flavorful angel food cake; said cake including a substantial amount of baked whipped egg whites; and the improvement comprising a plurality of colored marshmallow-lined, enlarged air pockets scattered through said cake.

References Cited in the file of this patent

"The Joy of Cooking," 1953, by Rombauer et al., The Bobbs-Merrill Co., Inc. (New York), page 599. (Copy in Div. 63.)

"Betty Crocker's Picture Cook Book," 2nd ed., 1956, published by McGraw-Hill Book Co., Inc. (New York), pages 130, 157 and 180. (Copy in Div. 63.)